(12) United States Patent
Kim et al.

(10) Patent No.: US 8,781,161 B2
(45) Date of Patent: Jul. 15, 2014

(54) IMAGE PROCESSING METHOD AND APPARATUS FOR GENERATING A 3D MODEL OF A TARGET OBJECT

(75) Inventors: Yong Sun Kim, Yongin-si (KR); Hwa Sup Lim, Hwaesong-si (KR); Byong Min Kang, Yongin-si (KR); Ouk Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 676 days.

(21) Appl. No.: 12/801,250

(22) Filed: May 28, 2010

(65) Prior Publication Data

US 2011/0069866 A1    Mar. 24, 2011

(30) Foreign Application Priority Data

Sep. 22, 2009    (KR) ........................ 10-2009-0089786

(51) Int. Cl.
*G06K 9/00*    (2006.01)
*G06K 9/32*    (2006.01)
(52) U.S. Cl.
CPC .............. *G06K 9/00369* (2013.01); *G06K 9/3241* (2013.01)
USPC ........................................................ 382/103
(58) Field of Classification Search
USPC ............................... 382/103, 118, 154
See application file for complete search history.

(56) References Cited

U.S. PATENT DOCUMENTS

| | | | |
|---|---|---|---|
| 6,188,777 B1 * | 2/2001 | Darrell et al. | 382/103 |
| 6,965,690 B2 * | 11/2005 | Matsumoto | 382/154 |
| 7,065,242 B2 * | 6/2006 | Petrov et al. | 382/154 |
| 7,184,047 B1 * | 2/2007 | Crampton | 345/473 |
| 2008/0180448 A1 * | 7/2008 | Anguelov et al. | 345/475 |
| 2009/0141021 A1 | 6/2009 | Lee et al. | |
| 2009/0154794 A1 | 6/2009 | Kim et al. | |
| 2009/0232353 A1 * | 9/2009 | Sundaresan et al. | 382/103 |
| 2010/0195869 A1 * | 8/2010 | Geiss | 382/103 |

FOREIGN PATENT DOCUMENTS

| | | | |
|---|---|---|---|
| JP | 10-124704 | 5/1998 | |
| JP | 2000-194859 | 7/2000 | |
| JP | 2002-32743 | 1/2002 | |
| JP | 2002-230582 | 8/2002 | |
| JP | 2008-107877 | 5/2008 | |
| KR | 2000-0037781 | 7/2000 | |
| KR | 10-2007-0066697 | 6/2007 | |
| KR | 10-2008-0052272 | 6/2008 | |
| KR | 10-0860375 | 9/2008 | |
| WO | WO 2007132451 | * 11/2007 | 382/154 |

* cited by examiner

*Primary Examiner* — Hadi Akhavannik
(74) *Attorney, Agent, or Firm* — Staas & Halsey LLP

(57) ABSTRACT

Provided is an image processing apparatus. The image processing apparatus may extract a three-dimensional (3D) silhouette image in an input color image and/or an input depth image. Motion capturing may be performed using the 3D silhouette image and 3D body modeling may be performed.

24 Claims, 18 Drawing Sheets
(13 of 18 Drawing Sheet(s) Filed in Color)

200

300

700

900

1300

1600

1700

IMAGE PROCESSING METHOD AND APPARATUS FOR GENERATING A 3D MODEL OF A TARGET OBJECT

CROSS-REFERENCE TO RELATED APPLICATIONS

This application claims the priority benefit of Korean Patent Application No. 10-2009-0089786, filed on Sep. 22, 2009, in the Korean Intellectual Property Office, the disclosure of which is incorporated herein by reference.

BACKGROUND

1. Field

One or more embodiments relate to an image processing method and apparatus that may perform three-dimensional (3D) modeling of a target object such as a human body, and more particularly, to an image processing method and apparatus that may quickly perform 3D modeling of a target object using a depth image.

2. Description of the Related Art

Currently, with developments in image processing technologies, people are increasingly interested in three-dimensional (3D) modeling of a target object such as a human body. 3D modeling of the human body may be variously used for a virtual reality, a computer graphic in a move and a game, and the like.

For 3D modeling of the target object, a scheme of scanning spatial information associated with the target object using a laser scanner, a scheme of synthesizing color images obtained using a plurality of color cameras, and the like are generally used in the art.

However, the above schemes generally need a particular photographing environment or a relatively large amount of time for processing and thus there are constraints on utilization of the above schemes.

Accordingly, there is a desire for a method that may overcome the above constraints and thereby quickly perform 3D modeling of a target object.

SUMMARY

According to an aspect of one or more embodiments, there may be provided an image processing apparatus including a silhouette image generator to generate a three-dimensional (3D) silhouette image of a target object using at least one of an input depth image and an input color image, a motion modeling unit to generate a skeleton model of the target object by performing motion capturing of the target object using the 3D silhouette image, and a 3D model generator to generate a 3D model of the target object by matching a template mesh model with the skeleton model of the target object using at least one processor.

The target object may correspond to a human body.

The silhouette image generator may divide the input depth image into a plurality of segments by performing a pixel segmentation of the input depth image, and generates the 3D silhouette image of the target image by performing a training-based head detection with respect to the plurality of segments.

The silhouette image generator may refine the 3D silhouette image of the target object, generated using the input depth image, based on a result of performing the pixel segmentation of the input color image.

The motion modeling unit may include a first calculator to perform a training-based head detection in the 3D silhouette image, and to calculate locations of limbs of the target object and a location of at least one joint that connects the plurality of limbs using a rectangle fitting algorithm based on a detected head portion, and a second calculator to perform motion capturing of the target object based on the locations of the limbs and the location of the at least one joint, and to generate the skeleton model of the target object.

The image processing apparatus may further include a 3D model refinement unit to refine the 3D model of the target object by refining the template mesh model matched with the skeleton model of the target object using the 3D silhouette image.

The image processing apparatus may further include a texture generator to generate a texture of the 3D model of the target object using the input color image.

The image processing apparatus may further include a texture database to store texture data applicable to the 3D model of the target object. The texture generator may generate the texture of the 3D model of the target object based on the texture data stored in the texture database.

The image processing apparatus may further include an image matching unit to match the input color image with the input depth image when the input depth image and the input color image do not match each other.

The 3D model generator may transform the template mesh model to the skeleton model of the target objet using a radial basis function.

According to another aspect of one or more embodiments, there may be provided an image processing apparatus including a silhouette image generator to generate a 3D silhouette image of a target object using an input depth image, a motion modeling unit to generate a skeleton model of the target object by performing motion capturing of the target object using the 3D silhouette image, a 3D model generator to generate a 3D model of the target object by matching a template mesh model with the skeleton model of the target object, a texture database to store texture data applicable to the 3D model of the target object, and a texture generator to generate a texture of the 3D model of the target object based on the texture data stored in the texture database using at least one processor.

According to still another aspect of one or more embodiments, there may be provided an image processing method including generating a 3D silhouette image of a target object using at least one of an input depth image and an input color image, generating a skeleton model of the target object by performing motion capturing of the target object using the 3D silhouette image, and generating a 3D model of the target object by matching a template mesh model with the skeleton model of the target object. Image processing method may be performed using at least one processor.

The generating of the 3D silhouette image may include dividing the input depth image into a plurality of segments by performing a pixel segmentation of the input depth image, and generating the 3D silhouette image of the target image by performing a training-based head detection with respect to the plurality of segmentations.

The generating of the skeleton model may include performing a training-based head detection in the 3D silhouette image to calculate locations of limbs of the target object and a location of at least one joint that connects the plurality of limbs using a rectangle fitting algorithm based on a detected head portion, and performing motion capturing of the target object based on the locations of the limbs of the target object and the location of the at least one joint to generate the skeleton model of the target object.

According to still another aspect of one or more embodiments, there may be provided an image processing method including generating a 3D silhouette image of a target object using an input depth image; generating a skeleton model of the target object by performing motion capturing of the target object using the 3D silhouette image; generating a 3D model of the target object by matching a template mesh model with the skeleton model of the target object; storing texture data applicable to the 3D model of the target object in a texture database; and generating a texture of the 3D model of the target object based on the texture data stored in the texture database. Image processing method may be performed using at least one processor According to another aspect of the present invention, there is provided at least one computer readable medium storing computer readable instructions to implement methods of embodiments.

Additional aspects of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of embodiments, taken in conjunction with the accompanying drawings of which.

DETAILED DESCRIPTION

Figure 1:
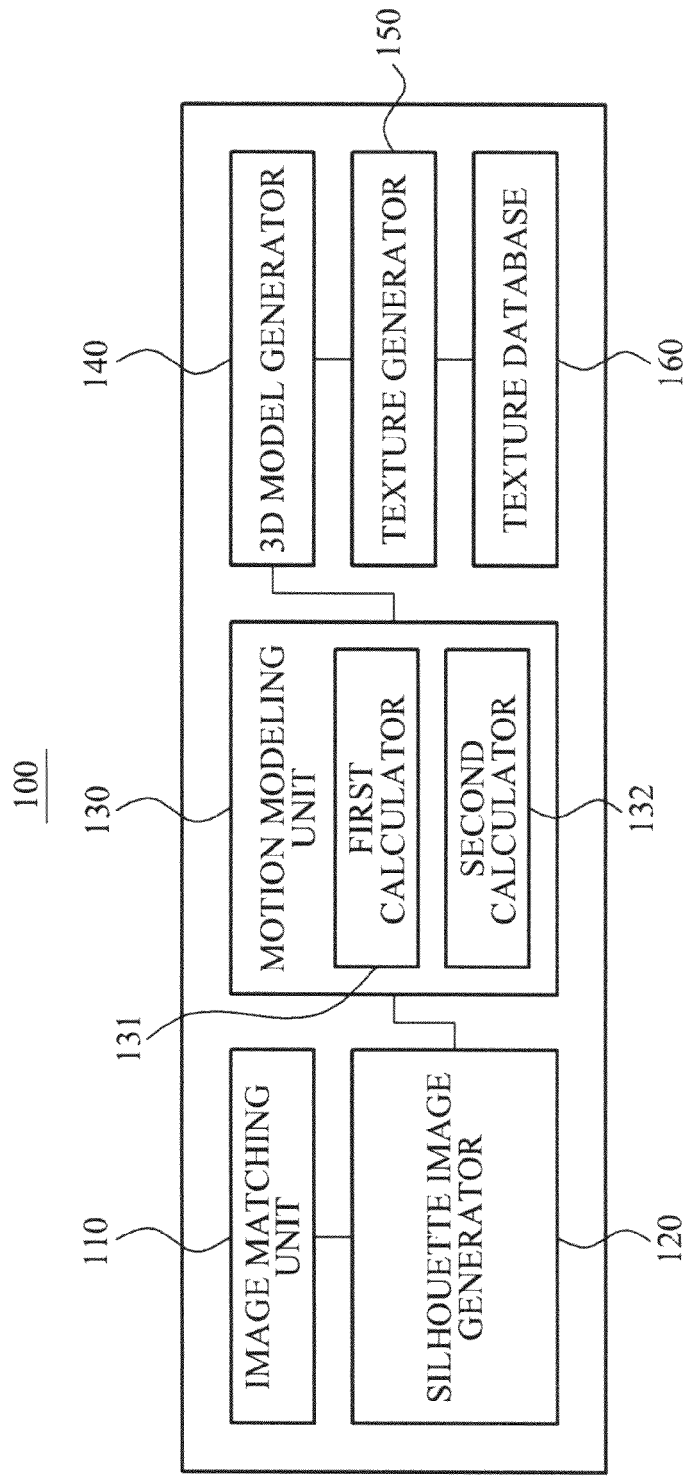
FIG. 1 illustrates a configuration of an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing apparatus 100 according to an embodiment.

The image processing apparatus 100 may receive a depth image and a color image, and perform modeling of a target object included in the depth image. When the target object corresponds to a human body, the image processing apparatus 100 may perform three-dimensional (3D) modeling.

Depending on embodiments, an input of the color image may be omitted. A 3D model may be generated using only the input depth image. Texture information may be selected from data stored in a texture database 160.

When a resolution of the input depth image is lower than a resolution of the input color image, an image matching unit 110 may match the input depth image with the input color image using a known camera calibration scheme, and the like.

During the above process, spatial coordinate values of pixels constituting the input depth image may be changed by extracting characteristic points and calculating a transformation matrix. A resolution difference may be solved using an interpolation scheme and the like.

When the input depth image is matched with the input color image, or the input depth image matched with the color image is received, a silhouette image generator 120 may extract a 3D silhouette image using the input depth image.

For example, the silhouette image generator 120 may perform a pixel segmentation with respect to each of the pixels constituting the input depth image, and divide the input depth image into a plurality of segments.

The silhouette image generator 120 may detect, among the plurality of segments, a segment corresponding to the target object that is the human body, through a training-based face detection or head detection.

A process of extracting, by the silhouette image generator 120, the 3D silhouette image using the input depth image will be further described with reference to FIGS. 4 and 5.

When the 3D silhouette image is generated, a first calculator 131 of a motion modeling unit 130 may perform the head detection in the 3D silhouette image, and may calculate locations of limbs and joints of the target object based on a detected head portion using a rectangle fitting algorithm and the like.

A second calculator 132 may generate a skeleton model of the target object based on the calculated locations of the limbs and the joints, and provide the generated skeleton model.

An operation of the motion modeling unit 130 will be further described with reference to FIG. 6.

A 3D model generator 140 may match the target model with a template mesh model through a process of transforming, to a shape of the skeleton model generated by the motion modeling unit 130, skeleton information of the template mesh model given in advance, for example, locations of limbs and joints.

An operation of the 3D model generator 140, for example, a transformation and a refinement of the template mesh model will be further described with reference to FIGS. 7 through 11.

A texture generator 150 may determine a texture of the generated 3D mesh model based on the input color image.

The texture generator 150 may divide the texture of the 3D mesh model into a plurality of segments based on the input color image and then select another texture stored in the texture database 160 and perform 3D modeling of the selected other texture.

An operation of the texture generator 150 will be further described with reference to FIGS. 13 through 16.

Figure 2:
FIG. 2 illustrates an input color image according to an embodiment.

FIG. 2 illustrates an input color image 200 according to an embodiment.

The input color image 200 may include a background portion and a body portion that is a target object. According to an embodiment, a 3D body model corresponding to a target object portion may be generated.

Figure 3:
FIG. 3 illustrates an input depth image according to an embodiment.

FIG. 3 illustrates an input depth image 300 according to an embodiment.

The input depth image 300 may be obtained using a depth camera, for example, using a depth camera employing a time of flight (TOF) scheme.

When a viewpoint or a resolution of a color camera used to obtain the input color image 200 of FIG. 2 is different from a viewpoint or a resolution of the depth camera used to obtain the input depth image 300, the input depth image 300 may be matched with the input color image 200 using a known calibration scheme.

When the resolution of the input depth image is lower than the resolution of the input color image 200, the image matching unit 110 of FIG. 1 may match the input depth image 300 with the input color image 200 using a known camera calibration scheme and the like.

During the above calibration scheme, spatial coordinate values of pixels constituting the input depth image 300 may be changed by extracting characteristic points and calculating a transformation matrix. A resolution difference may be solved using an interpolation scheme and the like.

Figure 4:
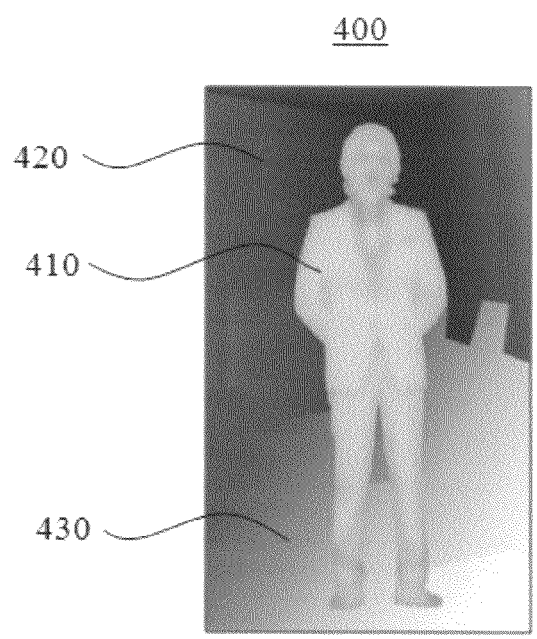
FIG. 4 illustrates a result of matching the input depth image of FIG. 3 with the input color image of FIG. 2 according to an embodiment.

FIG. 4 illustrates a result of matching the input depth image 300 of FIG. 3 with the input color image 200 of FIG. 2 according to an embodiment.

Referring to FIG. 4, a new depth image 400 is matched with the input color image 200 in aspects of a viewpoint or a resolution.

However, the above depth image-color image matching process may be selectively performed depending on embodiments. For example, when the input color image 200 and the input depth image 300 are obtained using the same sensor, the above depth image-color image matching process may be omitted.

The depth image 400 may include a target object portion 410 for 3D modeling and background portions 420 and 430.

The silhouette image generator 120 of FIG. 1 may extract a 3D silhouette image in the depth image 400.

For example, the silhouette image generator 120 may perform a pixel segmentation with respect to each of pixels constituting the depth image 400, and thereby divide the input depth image into a plurality of segments.

The silhouette image generator 120 may detect, among the plurality of segments, a segment corresponding to the target object portion 410 that is a human body portion, through a training-based face detection or head detection.

In this instance, a probability may be high that pixels of which depth values exceed a predetermined threshold may not be included in the target object portion 410. Therefore, the pixels may be excluded in the segmentation process.

Also, a wall portion or a floor portion corresponding to the background portion 420 or 430 may be modeled according to a planar equation generated using at least three adjacent pixel values. Pixels corresponding to the above plane may be collectively excluded.

When an intensity image matched with the depth image 400 is provided to the silhouette image generator 120, the silhouette image generator 120 may remove a depth folding portion using the provided intensity image, to thereby enhance a quality of the extracted 3D silhouette image.

In this instance, it may also be possible to enhance the quality of the extracted 3D silhouette image using various types of pre-processing and/or post-processing schemes.

Figure 5:
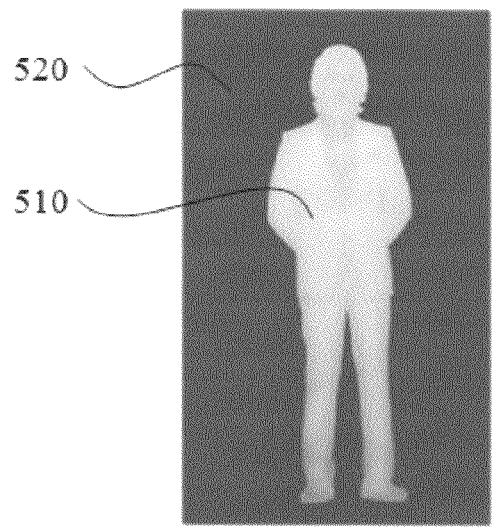
FIG. 5 illustrates a three-dimensional (3D) silhouette image extracted in the depth image of FIG. 4 according to an embodiment.

FIG. 5 illustrates a 3D silhouette image 500 extracted in the depth image 400 of FIG. 4 according to an embodiment.

A process of extracting the 3D silhouette image 500 using the depth image 400 is described above. A pixel segmentation may be performed with respect to the input color image 200. In this process, the depth image 400 may be used together with the input color image 200.

It is possible to enhance a quality of the 3D silhouette image 500 through a refining process using the input color image 200 before or after extracting the 3D silhouette image 500 in the depth image 400.

In the 3D silhouette image 500, pixels constituting a target object portion 510 may have a depth value and thus be coordinated, that is, may be expressed using spatial coordinates.

A portion 520 excluding the target object portion 510 in the 3D silhouette image 500 may remain blank.

Figure 6:
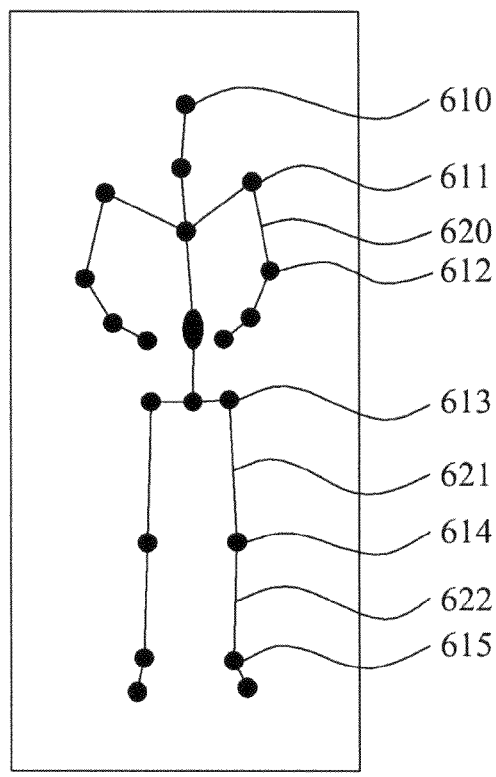
FIG. 6 illustrates a skeleton model generated using the 3D silhouette image of FIG. 5 according to an embodiment.

FIG. 6 illustrates a skeleton model 600 generated based on the 3D silhouette image 500 of FIG. 5.

The first calculator 131 of FIG. 1 may perform a head detection in the 3D silhouette image 500, and calculate locations of limbs and joints of a target object using a rectangle fitting algorithm and the like, based on a detected head portion.

However, the rectangle fitting algorithm is only an example and thus it is possible to adopt another algorithm for generating the skeleton model 600 of the target object using the 3D silhouette image 500.

For more precise measurement, it is possible to generate the skeleton model 600 of the target object using a separate motion capturing scheme, for example, using a general motion sensor and the like.

In FIG. 6, when locations of the detected head portion and joints including joints 610, 611, 612, 613, 614, and 615 are calculated, and locations of limbs including limbs 620, 621, and 622 are verified, the second calculator 132 may generate and provide the skeleton model 600 of the target object.

In the above process, it is possible to further increase a number of joints calculated by the first calculator 131 using various types of mathematical schemes, for example, an inverse-kinematics scheme. Accordingly, it is possible to enhance an accuracy of the skeleton model 600.

Figure 7:
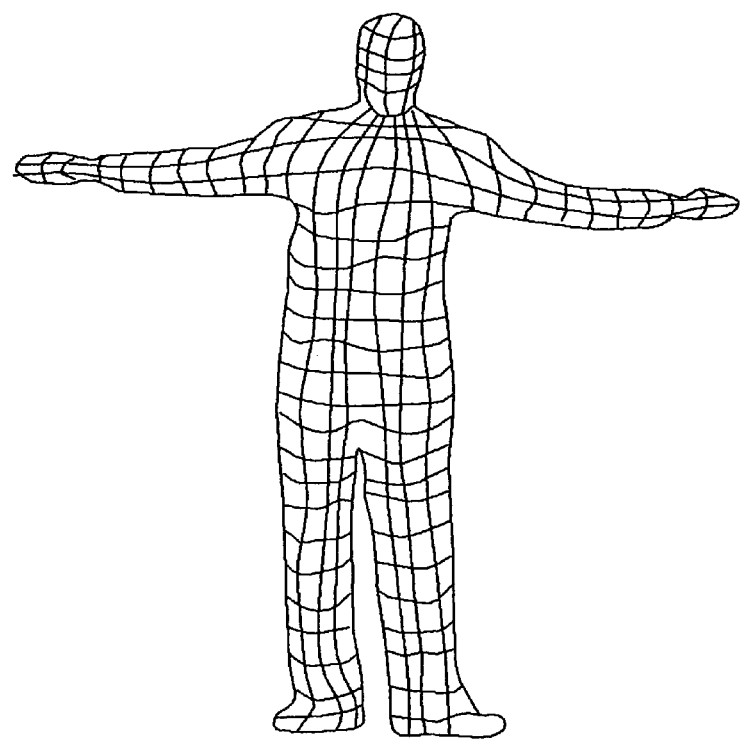
FIG. 7 illustrates a template mesh model used in an image processing apparatus according to an embodiment.

FIG. 7 illustrates a template mesh model 700 used in an image processing apparatus according to an embodiment.

The template mesh model 700 may include mesh-based geometric information.

A posture of the current template mesh model 700 may be different from a posture of the above target object. A height, a body shape, and the like of the template mesh model 700 may be different from a height, a body shape, and the like of the target object.

Accordingly, a process of matching the posture, the body shape, and the like between the template mesh model 700 and the target object may be performed.

Figure 8:
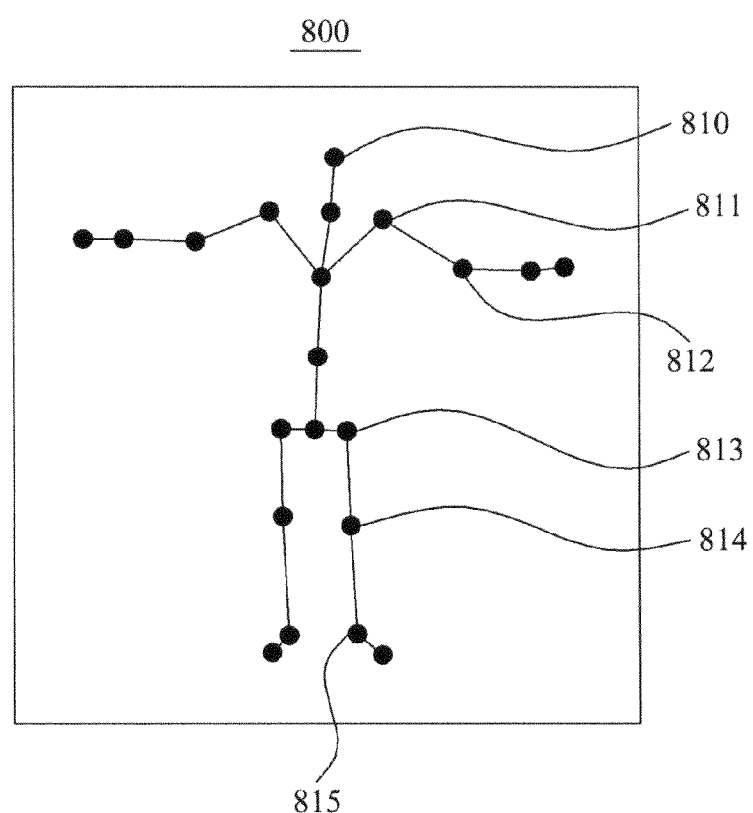
FIG. 8 illustrates a skeleton model of the template mesh model of FIG. 7 according to an embodiment.

FIG. 8 illustrates a skeleton model 800 of the template mesh model 700 of FIG. 7 according to an embodiment.

Skeleton information associated with the template mesh model 700, for example, locations of a head portion, joints including joints 810, 811, 812, 813, 814, and 815, and limbs may be provided in advance together with the template mesh model 700.

The skeleton information associated with the template mesh model 700 may include information associated with a same number of joints and limbs as the number of joints and limbs of the skeleton model 600 of the target object.

Accordingly, when calculating a matrix equation of transforming spatial coordinates of the joints of the skeleton model 800 of the template mesh model 700 to spatial coordinates of the joints of the skeleton model 600 of the target object of FIG. 6, it is possible to change a posture or a body shape of the template mesh model 700 to be similar to the posture or the body shape of the target object by applying the calculated matrix equation to a plurality of vertexes of the template mesh model 700.

Figure 9:
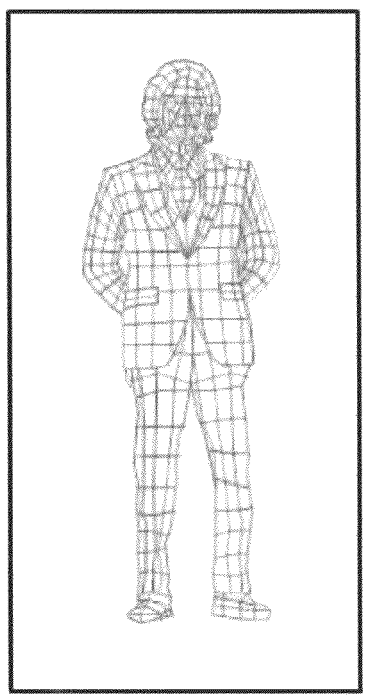
FIG. 9 illustrates a result of transforming, by an image processing apparatus, the template mesh model of FIG. 7 to be matched with the skeleton model of FIG. 6 according to an embodiment.

FIG. 9 illustrates a result of transforming, by an image processing apparatus, the template mesh model 700 of FIG. 7 to be matched with the skeleton model 600 of FIG. 6 according to an embodiment.

In the case of a transformed mesh model 900, skeleton information associated with the transformed mesh model 900 may be similar to skeleton information associated with the target object, however may include inaccuracies. The 3D model generator 140 of FIG. 1 may refine the transformed mesh model 900 to thereby generate a more accurate 3D model. The above process will be further described with reference to FIGS. 10 and 11.

Figure 10:
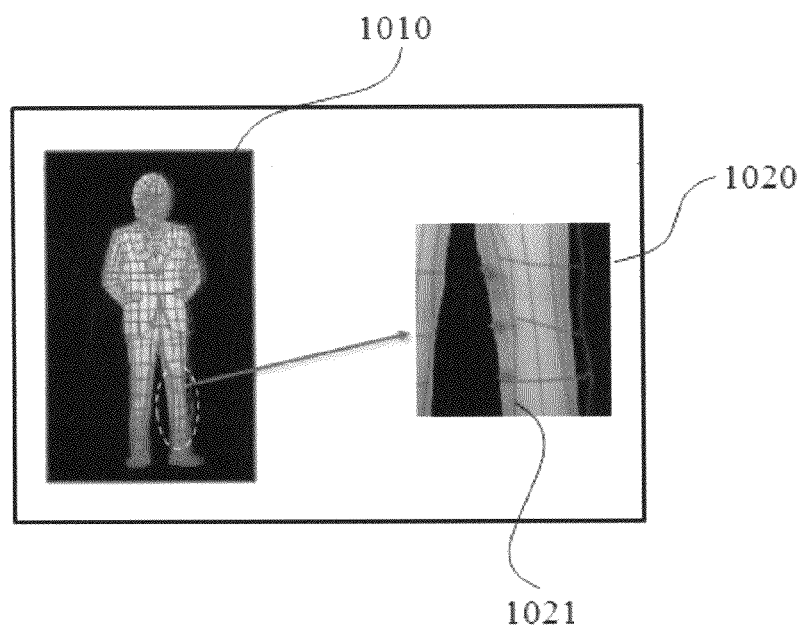
FIG. 10 illustrates a mesh model, unrefined, to be matched with the 3D silhouette image of FIG. 5.

FIG. 10 illustrates a mesh model 1010, unrefined, to be matched with the 3D silhouette image 500 of FIG. 5.

Referring to a partially enlarged view 1020 of a knee portion of the mesh model 1010, it can be seen that an outline 1021 of a mesh does not match an outline of the 3D silhouette image 500.

Accordingly, the mesh model 1010 generated using only the above process may include inaccuracies, for example, appearing to be larger or thinner than an actual target object, having a slightly different posture from the actual target object, and the like.

Accordingly, the 3D model generator 140 of FIG. 1 may refine the above portion through image processing.

Figure 11:
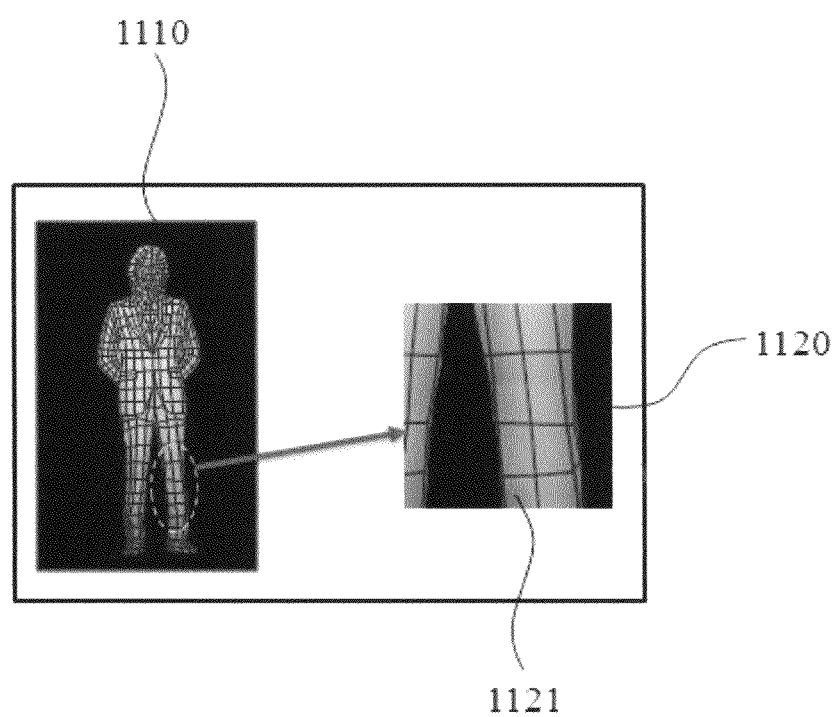
FIG. 11 illustrates a mesh model, refined, to be matched with the 3D silhouette image of FIG. 5, according to an embodiment.

FIG. 11 illustrates a mesh model 1110, refined, to be matched with the 3D silhouette image 500 of FIG. 5, according to an embodiment.

Referring to a partially enlarged view 1120 of a knee portion of the mesh model 1110, it can be seen that an outline 1121 of a mesh matches an outline of the 3D silhouette image 500.

Depending on embodiments, the above refinement process may not be performed. For example, the above refinement process may be omitted and may also be regarded as a trade-off between an amount of calculations and a quality of the 3D model.

When the 3D model is generated, the texture generator 150 may determine a texture of the 3D mesh model 1110.

The texture may include color information and the like.

The texture generator 150 may generate the texture of the 3D mesh model 1110 using the input color image 200 of FIG. 2.

Figure 12:
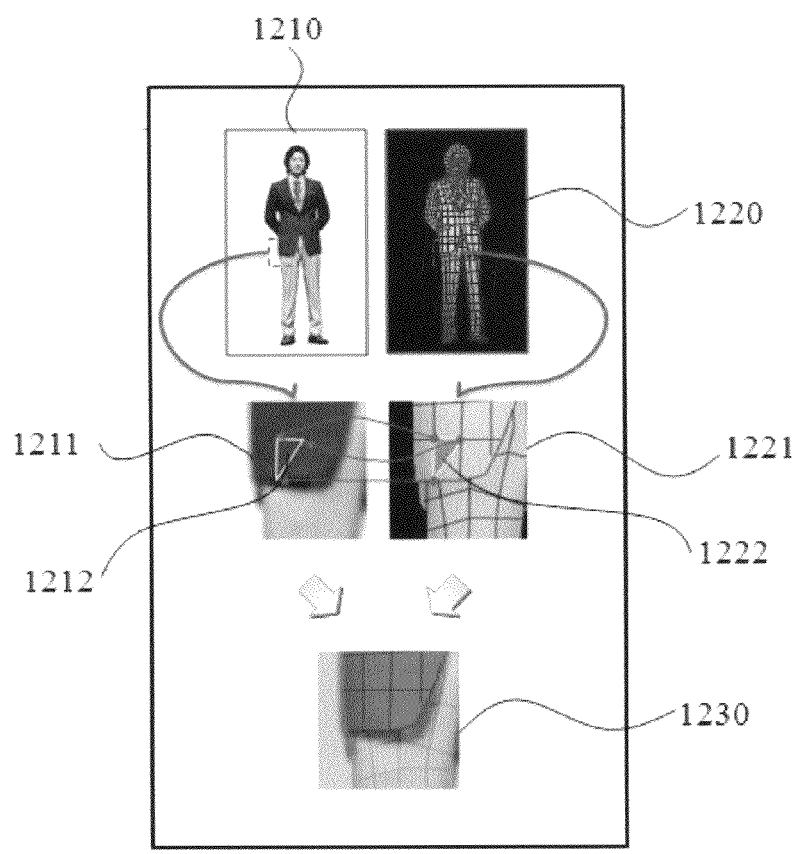
FIG. 12 illustrates a process of generating texture information of a mesh model based on pixel values of an input color image according to an embodiment.

FIG. 12 illustrates a process of generating texture information of a mesh model 1220 based on pixel values of an input color image 1210.

Referring to a partially enlarged view 1211 of the input color image 1210, it is possible to be aware of a color value of a portion corresponding to a particular mesh 1212 of the mesh model 1220. Accordingly, a color value of a mesh 1222 within a partially enlarged view 1221 of the mesh model 1220 may be determined.

In this case, since the input color image 1210 is matched with the depth image 400, the 3D silhouette image 500, and the mesh model 1220, a reliability of the result 1230 may be guaranteed.

Figure 13:
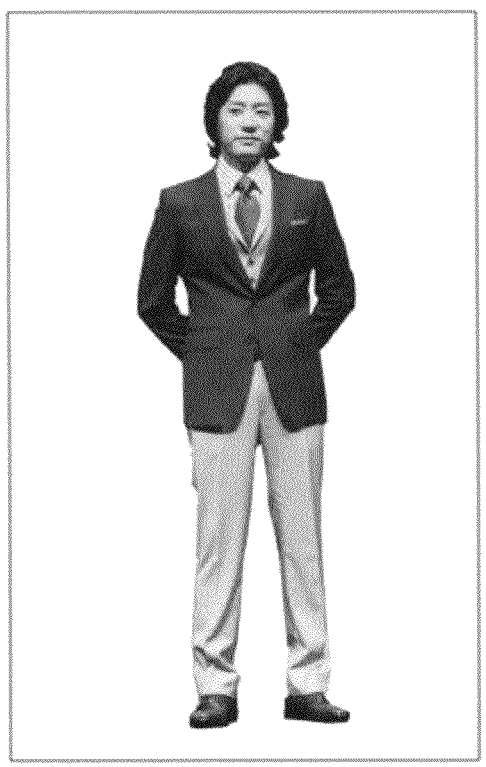
FIG. 13 illustrates a result of generating texture information of the mesh model of FIG. 11 based on pixel values of an input color image according to an embodiment.

FIG. 13 illustrates a result of generating texture information of the mesh model 1220 of FIG. 12 based on pixel values of the input color image 200 according to an embodiment.

Since color values are obtained from the actual input color image 200, a texture 1300 of the 3D model similar to the actual input color image 200 may be generated.

Although the texture 1300 of the 3D model is generated by applying the color values of the actual color image 200 as is, it is only an example.

For various other applications of the 3D model, it is possible to arbitrarily change texture information of the 3D model appearing as through switching clothes of an avatar online.

The above process will be further described.

Figure 14:
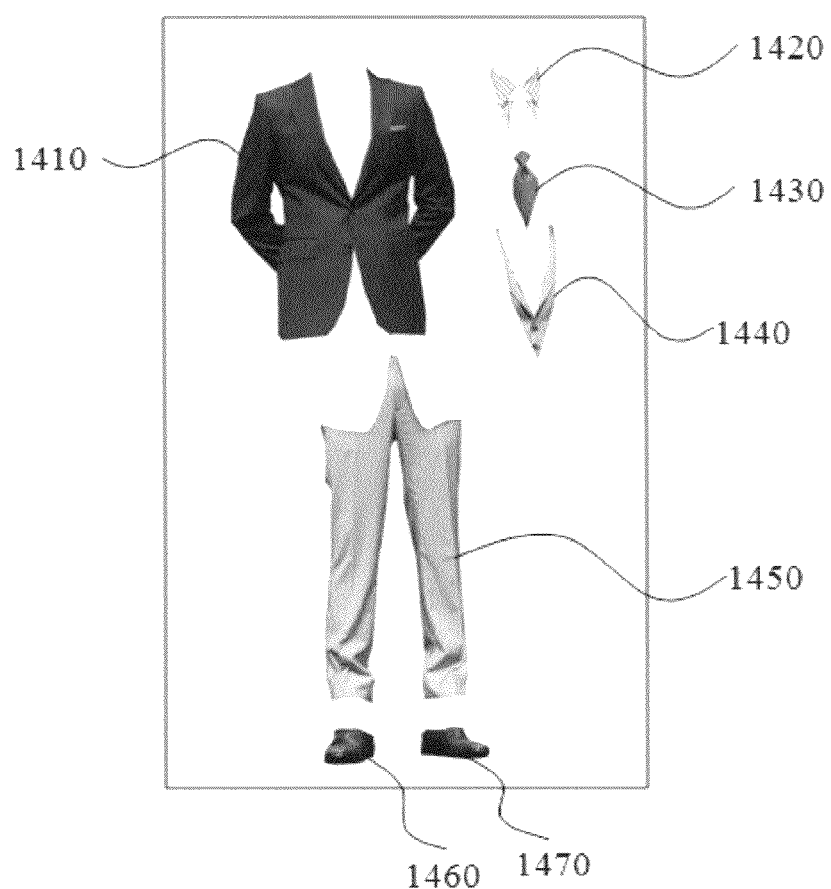
FIG. 14 illustrates a result of segmenting the texture information of FIG. 13 according to an embodiment.

FIG. 14 illustrates a result of segmenting the texture information of FIG. 13 according to an embodiment.

To arbitrarily change the texture of the 3D mesh model 1220, the texture generator 150 may divide the texture of FIG. 13 into a plurality of segments.

In FIG. 14, the plurality of segments may include a jacket portion segment 1410, a shirt color portion segment 1420, a tie portion segment 1430, a cardigan portion segment 1440, a trouser portion segment 1450, and shoe portion segments 1460 and 1470.

The above segments may be replaced by segment data of a different shape and different color that is stored in the texture database 160.

Figure 15:
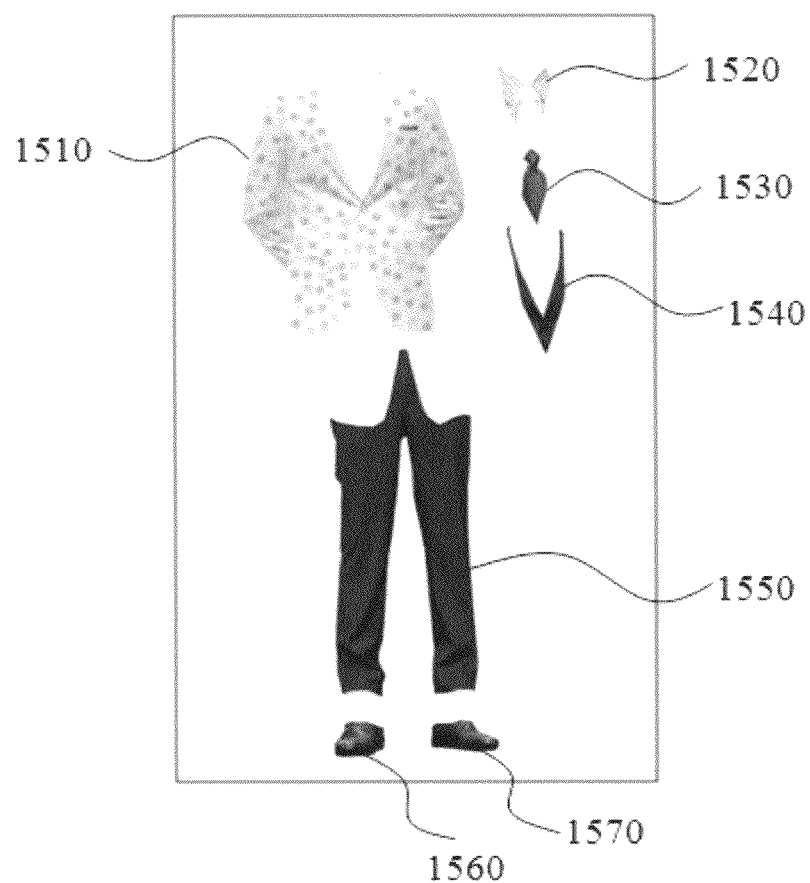
FIG. 15 illustrates a view of selecting texture information segments to replace texture information segments of FIG. 14 using a texture database according to an embodiment.

FIG. 15 illustrates a view of selecting texture information segments to replace texture information segments of FIG. 14 using the texture database 160 according to an embodiment.

Referring to FIG. 15, it can be seen that the jacket portion segment 1410, the shirt color portion segment 1420, the tie portion segment 1430, the cardigan portion segment 1440, the trouser portion segment 1450, and the shoe portion segments 1460 and 1470 of FIG. 14 are replaced by segments 1510, 1520, 1530, 1550, 1560, and 1570, respectively.

Figure 16:
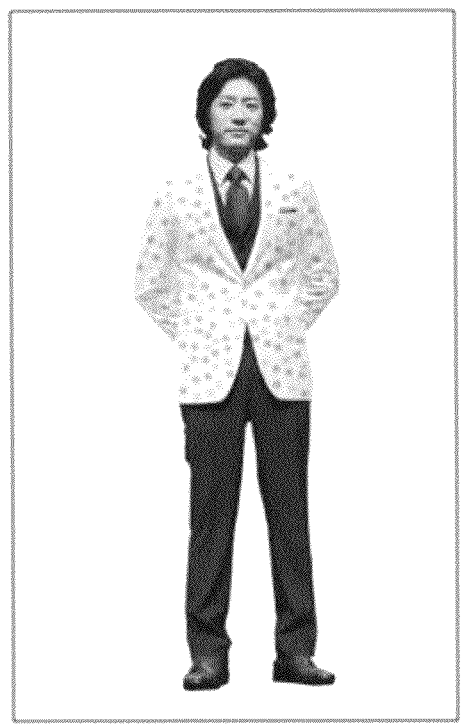
FIG. 16 illustrates a result of applying the selected texture information segments of FIG. 15 to the mesh model of FIG. 12 according to an embodiment.

FIG. 16 illustrates a result of applying the selected texture information segments of FIG. 15 to the mesh model 1220 of FIG. 12 according to an embodiment.

It can be seen that a texture 1600 of the 3D model is different from the texture 1300 of the 3D model of FIG. 13. It can be understood from the above process that various types of modifications and applications may be applicable.

Figure 17:
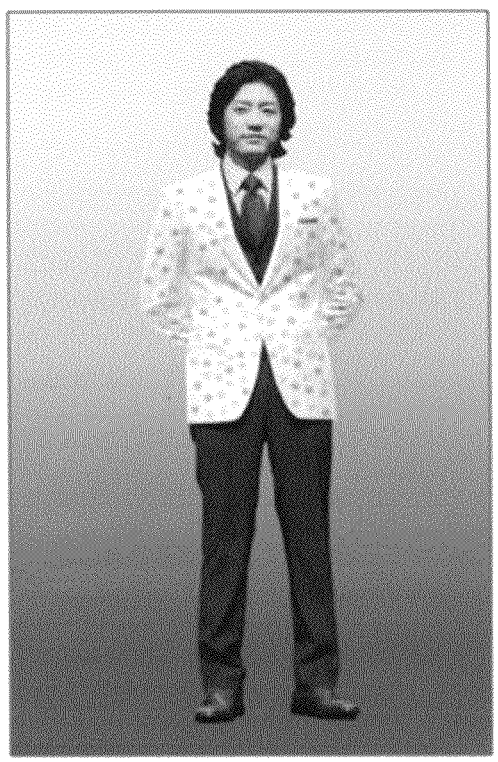
FIG. 17 illustrates a 3D model of a target object according to an embodiment.

FIG. 17 illustrates a 3D model 1700 of a target object according to an embodiment.

The 3D model 1700 may represent a human body that is the target object.

Although not illustrated in the figures, it is possible to readily change a hair color, a hairstyle, a skin tone, and the like of the 3D model 1700 while maintaining a body shape of the 3D model 1700.

Figure 18:
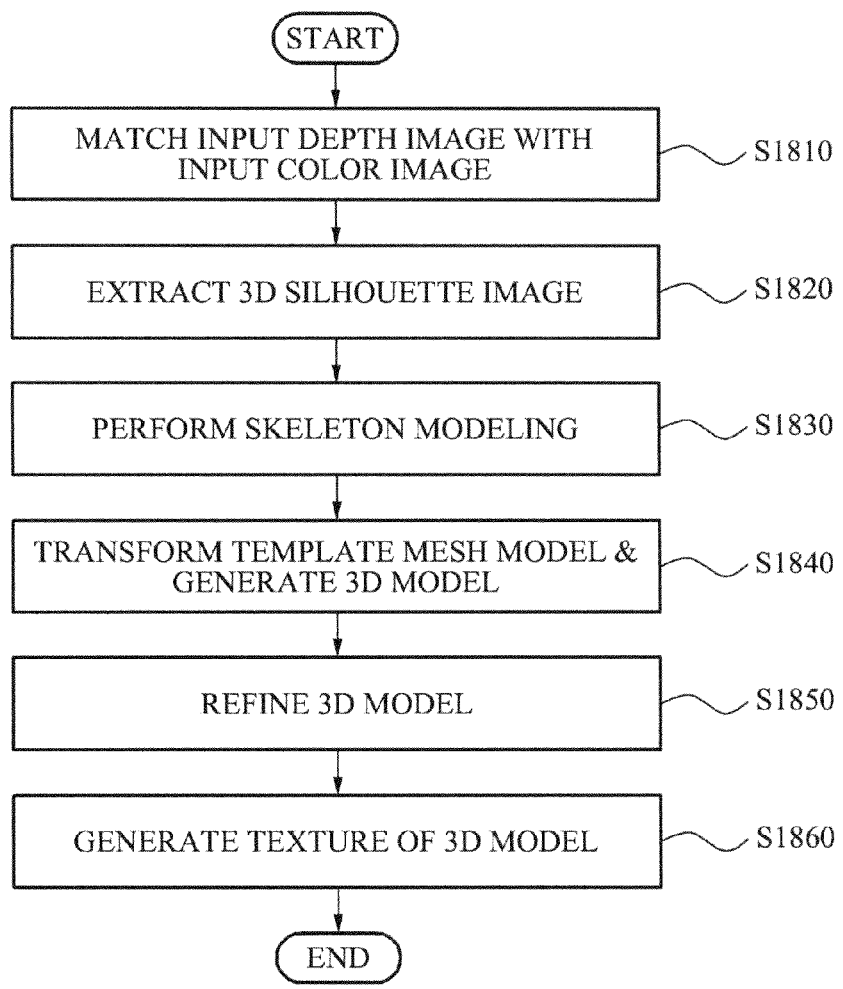
FIG. 18 illustrates an image processing method according to an embodiment.

FIG. 18 illustrates an image processing method according to an embodiment.

In operation S1810, when a resolution of an input depth image is lower than a resolution of an input color image, the input depth image may be matched with the input color image using a known camera calibration scheme and the like.

During the above process, spatial coordinate values of pixels constituting the input depth image may be changed by extracting characteristic points and calculating a transformation matrix. A resolution difference may be solved using an interpolation scheme and the like.

When the input depth image is matched with the input color image, or the input depth image matched with the input color image is received, operation S1810 may be omitted.

In operation S1820, a 3D silhouette image may be extracted using the input depth image.

In this case, a pixel segmentation may be performed with respect to each of the pixels constituting the input depth image. The input depth image may be divided into a plurality of segments.

A segment corresponding to a target object that is a human body may be detected among the plurality of segments through a training-based face detection or head detection.

The process of extracting the 3D silhouette image is described above with reference to FIGS. 4 and 5 and thus, further detailed descriptions related thereto will be omitted here.

In operation S1830, a head detection may be performed in the 3D silhouette image, and locations of limbs and joints of the target object may be calculated using a rectangle algorithm scheme based on a detected head portion.

A skeleton model of the target object may be generated based on the calculated locations of the limbs and the joints.

The process of generating the skeleton model is described above with reference to FIG. 6 and thus, further detailed descriptions related thereto will be omitted here.

In operation S1840, a template mesh model may be matched with the target object through a process of transforming skeleton information of the template mesh model, for example, locations of limbs and joints to the skeleton model generated in operation S1830.

After the transformation of the template mesh model, a refinement may be performed.

The above process is described above with reference to FIGS. 7 through 9 and thus, further detailed descriptions related thereto will be omitted here.

When there is a difference in a height, a body shape, and the like between the 3D model generated through the transformation of the template mesh model, and the actual target object, a refinement of the 3D model may be performed in operation S1850. The refinement process is described above with reference to FIGS. 10 and 11 and thus, further detailed descriptions related thereto will be omitted here.

In operation S1860, a texture of the generated 3D model may be generated using the input color image.

Also, in operation S1860, it is possible to divide the texture of the 3D model into a plurality of segments using the input color image, to select another texture stored in a texture database, and then to perform 3D modeling.

The above process is described above with reference to FIGS. 12 through 16 and thus, further detailed descriptions related thereto will be omitted here.

The image processing method according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus comprising:
   a silhouette image generator to generate a three-dimensional (3D) silhouette image of a target object using both an input depth image and an input color image matched with the input depth image;
   skeleton model generating unit to generate a skeleton model of the target object using the 3D silhouette image;
   a 3D model generator to generate a 3D model of the target object by matching a template mesh model with the skeleton model of the target object using at least one processor; and
   a 3D model refinement unit to refine the 3D model of the target object by refining the template mesh model matched with the skeleton model of the target object using the 3D silhouette image.

2. The image processing apparatus of claim 1, wherein the target object corresponds to a human body.

3. The image processing apparatus of claim 1, wherein the silhouette image generator divides the input depth image into a plurality of segments by performing a pixel segmentation of the input depth image, and generates the 3D silhouette image of the target image by performing a training-based head detection with respect to the plurality of segments.

4. The image processing apparatus of claim 3, wherein the silhouette image generator refines the 3D silhouette image of the target object, generated using the input depth image, based on a result of performing the pixel segmentation of the input color image.

5. The image processing apparatus of claim 1, wherein the motion modeling unit comprises:
   a first calculator to perform a training-based head detection in the 3D silhouette image, and to calculate locations of limbs of the target object and a location of at least one joint that connects the plurality of limbs using a rectangle fitting algorithm based on a detected head portion; and
   a second calculator to perform motion capturing of the target object based on the locations of the limbs and the location of the at least one joint, and to generate the skeleton model of the target object.

6. The image processing apparatus of claim 1, further comprising:

a texture generator to generate a texture of the 3D model of the target object using the input color image.

7. The image processing apparatus of claim 6, further comprising:
a texture database to store texture data applicable to the 3D model of the target object,
wherein the texture generator generates the texture of the 3D model of the target object based on the texture data stored in the texture database.

8. The image processing apparatus of claim 1, further comprising:
an image matching unit to match the input color image with the input depth image when the input depth image and the input color image do not match each other.

9. The image processing apparatus of claim 1, wherein the 3D model generator transforms the template mesh model to the skeleton model of the target object using a radial basis function.

10. An image processing apparatus comprising:
a silhouette image generator to generate a 3D silhouette image of a target object using both an input depth image and an input color image matched with the input depth image;
a skeleton model generating unit to generate a skeleton model of the target object using the 3D silhouette image;
a 3D model generator to generate a 3D model of the target object by matching a template mesh model with the skeleton model of the target object;
a 3D model refinement unit to refine the 3D model of the target object by refining the template mesh model matched with the skeleton model of the target object using the 3D silhouette image;
a texture database to store texture data applicable to the 3D model of the target object; and
a texture generator to generate a texture of the 3D model of the target object based on the texture data stored in the texture database using at least one processor.

11. The image processing apparatus of claim 10, wherein the silhouette image generator divides the input depth image into a plurality of segments by performing a pixel segmentation of the input depth image, and generates the 3D silhouette image of the target image by performing a training-based head detection with respect to the plurality of segments.

12. The image processing apparatus of claim 10, wherein the motion modeling unit comprises:
a first calculator to perform a training-based head detection with respect to the 3D silhouette image, and to calculate locations of limbs of the target object and a location of at least one joint that connects the plurality of limbs using a rectangle fitting algorithm based on a detected head portion; and
a second calculator to perform motion capturing of the target object based on the locations of the limbs of the target object and the location of the at least one joint, and to generate the skeleton model of the target object.

13. An image processing method comprising:
generating a 3D silhouette image of a target object using both an input depth image and an input color image matched with the input depth image;
generating a skeleton model of the target object using the 3D silhouette image;
generating a 3D model of the target object by matching a template mesh model with the skeleton model of the target object; and
refining the 3D model of the target object by refining the template mesh model matched with the skeleton model of the target object using the 3D silhouette image,
wherein the method is performed using at least one processor.

14. The image processing method of claim 13, wherein the generating of the 3D silhouette image comprises:
dividing the input depth image into a plurality of segments by performing a pixel segmentation of the input depth image; and
generating the 3D silhouette image of the target image by performing a training-based head detection with respect to the plurality of segmentations.

15. The image processing method of claim 13, wherein the generating of the skeleton model comprises:
performing a training-based head detection in the 3D silhouette image to calculate locations of limbs of the target object and a location of at least one joint that connects the plurality of limbs using a rectangle fitting algorithm based on a detected head portion; and
performing motion capturing of the target object based on the locations of the limbs of the target object and the location of the at least one joint to generate the skeleton model of the target object.

16. The image processing method of claim 13, further comprising:
generating a texture of the 3D model of the target object using the input color image.

17. The image processing method of claim 13, further comprising:
generating a texture of the 3D model of the target object based on texture data stored in a texture database.

18. At least one non-transitory computer readable medium storing computer readable instructions that control at least one processor to implement an image processing method comprising:
generating a 3D silhouette image of a target object using both an input depth image and an input color image matched with the input depth image
generating a skeleton model of the target object using the 3D silhouette image;
generating a 3D model of the target object by matching a template mesh model with the skeleton model of the target object; and
refining the 3D model of the target object by refining the template mesh model matched with the skeleton model of the target object using the 3D silhouette image.

19. An image processing method comprising:
generating a 3D silhouette image of a target object using both an input depth image and an input color image matched with the input depth image;
generating a skeleton model of the target object using the 3D silhouette image;
generating a 3D model of the target object by matching a template mesh model with the skeleton model of the target object;
refining the 3D model of the target object by refining the template mesh model matched with the skeleton model of the target object using the 3D silhouette image;
storing texture data applicable to the 3D model of the target object in a texture database; and
generating a texture of the 3D model of the target object based on the texture data stored in the texture database,
wherein the method is performed using at least one processor.

20. The image processing method of claim 19, wherein the generating of the 3D silhouette image of the target object includes dividing the input depth image into a plurality of segments by performing a pixel segmentation of the input depth image, and generating the 3D silhouette image of the target image by performing a training-based head detection with respect to the plurality of segments.

21. The image processing method of claim 19, wherein generating a 3D model of the target object comprises:
performing a training-based head detection with respect to the 3D silhouette image;
calculating locations of limbs of the target object and a location of at least one joint that connects the plurality of limbs using a rectangle fitting algorithm based on a detected head portion;
performing motion capturing of the target object based on the locations of the limbs of the target object and the location of the at least one joint; and
generating the skeleton model of the target object.

22. At least one non-transitory computer readable medium storing computer readable instructions that control at least one processor to implement the method of claim 19.

23. The image processing apparatus of claim 1, wherein the 3D model refinement unit adjusts the template mesh model according to the 3D silhouette image to align an outline of the template mesh model to correspond with an outline of the 3D silhouette image.

24. The image processing apparatus of claim 1, wherein a posture of the template mesh model is different from a posture of the target object.

* * * * *

UNITED STATES PATENT AND TRADEMARK OFFICE
CERTIFICATE OF CORRECTION

PATENT NO.          : 8,781,161 B2
APPLICATION NO.     : 12/801250
DATED               : July 15, 2014
INVENTOR(S)         : Yong Sun Kim et al.

It is certified that error appears in the above-identified patent and that said Letters Patent is hereby corrected as shown below:

On the Title Page

Column 1, Item [75] (Inventors), Line 2, Delete "(Hwaesong-si, (KR);" and insert -- (Hwaseong-si, (KR); --, therefor.

In the Claims

Column 10, Line 31, In Claim 1, delete "skeleton" and insert -- a skeleton --, therefor.

Signed and Sealed this
Fourth Day of November, 2014

Michelle K. Lee
*Deputy Director of the United States Patent and Trademark Office*